United States Patent [19]
Regan

[11] 3,910,690
[45] Oct. 7, 1975

[54] METHOD AND APPARATUS FOR DETERMINING VISUAL ACUITY IN A HUMAN SUBJECT

[75] Inventor: David Regan, Newcastle-under-Lyme, England

[73] Assignee: Wilkinson Sword Limited, London, England

[22] Filed: June 19, 1974

[21] Appl. No.: 480,886

Related U.S. Application Data
[63] Continuation of Ser. No. 328,781, Feb. 1, 1973, abandoned.

[30] Foreign Application Priority Data
Feb. 2, 1972 United Kingdom............... 4866/72

[52] U.S. Cl. .................. 351/31; 351/30; 351/35; 351/36; 351/39
[51] Int. Cl.² ........................................ A61B 3/02
[58] Field of Search .......... 350/287; 351/17, 30, 31, 351/32, 36, 35, 39

[56] References Cited
UNITED STATES PATENTS

| | | | |
|---|---|---|---|
| 2,385,992 | 10/1945 | Jobe..................................... | 351/32 |
| 2,454,959 | 11/1948 | Barnes............................ | 350/287 X |
| 2,463,813 | 3/1949 | Shepard............................... | 351/32 |
| 2,869,252 | 1/1959 | Casey.................................... | 351/31 |
| 3,341,951 | 9/1967 | Barnette........................... | 351/31 X |

OTHER PUBLICATIONS
Olof Bryngdahl, "Characteristics...Region," JOSA, Vol. 56, No. 6, pp. 811–815, 6-1966.

*Primary Examiner*—Paul A. Sacher
*Attorney, Agent, or Firm*—Wolfe, Hubbard, Leydig, Voit & Osann, Ltd.

[57] ABSTRACT

Visual acuity in a human subject is tested by sequentially presenting to him (for short time instants) a series of visual images. Each image in one particular example is circular and one quadrant of each presented circle is formed with a chequer pattern of areas of contrasting luminance or color. The position of the chequer pattern in each image and/or the spatial frequency of the pattern in each image is different from that for the other images, and for each presentation, the subject is asked for his response.

29 Claims, 7 Drawing Figures

METHOD AND APPARATUS FOR DETERMINING VISUAL ACUITY IN A HUMAN SUBJECT

This application is a continuation of application Ser. No. 328,781, filed Feb. 1, 1973, now abandoned.

BACKGROUND OF THE INVENTION

The invention relates to apparatus and methods for testing visual acuity in human subjects. More particularly, the invention relates to the measurement of the visual acuities of different retinal areas of the subject.

Various methods for testing visual defects are known. For example, conventional perimetry or campimetry uses as targets a series of discs which present different angular appearances at the eye. These targets are sequentially presented to the patient at different points in his visual field. A second type of target (the Landolt Target) is used particularly when the primary aim of the test is to measure visual acuity.

There are a number of disadvantages of these prior methods. Firstly, visual acuity is not directly measured: the limiting test measures the subject's ability to see targets which are either of small dimensions and/or of low spatial contrast. Furthermore, it is difficult to measure or compare quantitatively the visual acuities of small regions of the retina, especially when these regions are close to the fixation point, using the known methods. This difficulty arises from the patient's natural tendency to allow his eye to wander from the fixation point towards the stimulus target. It is an object of the invention to provide improved apparatus and an improved method for testing visual acuity.

It is another object of the invention to provide apparatus and a method which supplements conventional perimetry or campimetry by providing direct quantitative measures both of the absolute and of the comparative visual acuities of different retinal areas.

It is a further object of the invention to provide apparatus and a method which enables the quantitative measurement or comparison of the visual acuities of small regions of the retina even when these regions are close to the fixation point.

In testing a patient's visual function there is value in empirically distinguishing between his ability to see spatially-unstructured areas of light, and his ability to resolve patterns (which may be patterns of edges of luminance or edges of chromatic contrast), and yet a further object of the invention is to provide apparatus and a method which achieves this.

BRIEF SUMMARY OF THE INVENTION

According to the invention, there is provided a method of testing visual acuity in a human subject, comprising the steps of sequentially presenting to the subject a plurality of visual images, each image being presented for a controlled length of time and part only of it comprising a pattern of regular variations in two visually contrasting levels, the position of the pattern in each image and/or the spatial frequency of the said variation in each image being different from that for the other images.

According to the invention, there is further provided apparatus for testing visual acuity in human subjects, comprising presentation means for presenting, for a controlled period of time, a visual image including a pattern of regular variations between two visually contrasting levels which extends over a predetermined part only of the image, and means for changing the spatial frequency of the said variations and/or the position of the pattern relative to the image as a whole.

DESCRIPTION OF PREFERRED EMBODIMENTS

Figure 1:
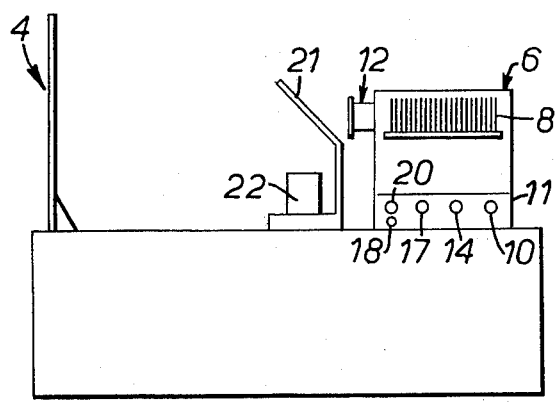
FIG. 1 is a side view of one form of the apparatus.
Figure 2:
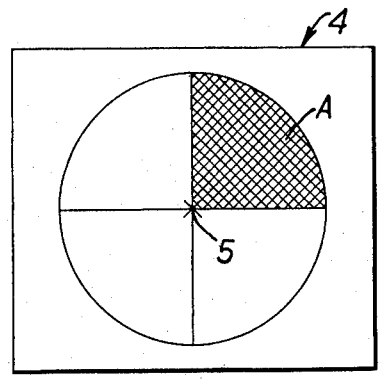
FIG. 2 is a front view of the apparatus, as presented to the subject, showing the presentation made to him.

The apparatus of FIGS. 1 and 2 comprises a ground glass screen 4 which is viewed by the subject from the left (as seen in FIG. 1) and has a fixation mark 5 at its centre. On the right hand side of the screen 4 is mounted a projector 6. The projector 6 may be a slide projector and is arranged to project various patterns (of a type to be described) onto the screen 4 for viewing by the subject. The various patterns to be projected are formed on slides 8, and, by means of a control 10, the operator can select each slide in turn and cause it to be inserted in the projection for projection on to the screen 4. Alternatively, film strip may be used which is advanced frame by frame. The projector is mounted on a box 11 containing the various control circuitry.

The projector 6 has a mechanism indicated generally at 12, and the shutter is opened automatically for a predetermined period each time a shutter operation switch 14 is operated. A timer, having a control 17, enables the period for which the shutter is open each time to be varied between, say, 0.05 seconds and 1 second.

A by-pass switch 18 can be operated to short-circuit the timer in order to hold the shutter open to facilitate accurate focussing.

A control 20 enables the brightness of the projection lamp to be varied. Neutral density filters may be used alternatively. Colour filters also allow acuity to be measured for different colours; this is of especial interest in testing for retrobulbar neuritis and optic atrophy.

FIG. 2 shows the image presented by one of the slides, and the other slide patterns have a generally similar format. As shown, the image is divided into four quadrants which are separated by a black cross. One quadrant A contains a chequer pattern and the other three quadrants have a fine cross hatching (omitted from the Figure for clarity) which is too small to be resolved by the subject but which represents a similar grey shade to the subject as the chequer pattern. For example, if the chequer pattern is made up of 50% white areas and 50% black areas, the cross hatching in the other three quadrants must be similarly made up. Thus when the whole pattern is viewed from a distance, at which the chequer pattern can no longer be recognised as such, the four quadrants will have a uniform intensity. The remaining slides have chequer patterns in different quadrants and/or differently sized chequer patterns. There may, for example be a total of 48 slides arranged in 12 sets, the images of each of the 12 sets being differently sized chequer patterns, and there being four slides in each set, the slides of each set having their chequer patterns in different quadrants.

FIG. 1 shows a half silvered mirror 21 through which the projector 6 projects the image onto the screen 4. This mirror enables a light source 22 to be provided to control the general background illumination.

In operation, the subject sits to the left of the screen 4 and is instructed to fixate the eye under test onto the fixation mark 5. By means of the slide selection switch 10, the operator selects the first slide, and then presses the shutter operation switch 14. The image on the first slide is thus projected onto the screen for a short period of time as set by the timer 16. The subject is asked for his response. He may be asked merely whether he sees or does not see a pattern in one quadrant. He may also be asked to indicate which quadrant was patterned.

The slides are arranged randomly, not only in terms of the retinal quadrants stimulated but also in terms of the angular size of the chequered pattern. This ensures that the patient cannot anticipate which quadrant will be stimulated. The short presentation time of the patterns prevents the patient moving his eye during the presentation (but the presentation time should not be so short that temporal integration of the Bloch's Law type is obtrusive or alternatively any such integration should be held constant and the parameters quoted for the particular test).

In this way, the subject's ability to distinguish between spatially-unstructured areas of light and patterns composed of edges of luminance contract (including edges between different colours) or of edges of chromatic contrast (chromatic contrast referring to patterns composed of differently coloured elements, e.g. checks or stripes, appearing equally bright) can be rapidly and accurately tested. More particularly, the visual acuities of small regions of the retina can be quantitatively measured or compared, even when these regions are close to the fixation point and extend by no more than one degree from the fixation point 5 for example.

In a modification, the patterns, instead of being composed of edges of luminance or chromatic contrast, comprise gratings producing a spatial sine wave variation (or similar variation) of luminance, the amplitude and spatial frequency being predetermined. Instead, the sine wave variation may be a chromatic instead of a luminance variation.

In order to avoid disturbing effects at the boundaries between the test quadrant of the pattern and the rest of the stimulus field, these boundaries can be blurred.

Although the apparatus has been described as presenting patterns arranged in quadrants, other pattern arrangements may be used instead in order to quantitatively measure localised field defects in terms of comparative acuities of local retinal regions. For example, the patterns may be arranged in octants or particular annular or part-annular regions of octants or quadrants.

The selection and projection of the various slide patterns can be carried out automatically under computer control.

The operator should have a paper, marked with the predetermined sequence of slides, on which he notes the patient's response. This allows the method to give assessment of visual field losses very rapidly.

The tests described have particular application in the detection and assessment of small visual losses (restricted perimetric losses) and in the early warning of developing field defects. The apparatus may be used for the more sensitive detection and quantification of visual field defects due to retinal, optic nerve, optic tract, optic radiation or cortical pathology, and in the early warning, sensitive detection, and sensitive measurement of the effects in visual field losses which accompany occular manifestations of demyelinating disease (retrobulbar neuritis and optic neuritis).

The fixation mark 5 on which the subject is asked to fixate may be replaced by a dimly illuminated light spot.

Figure 3:
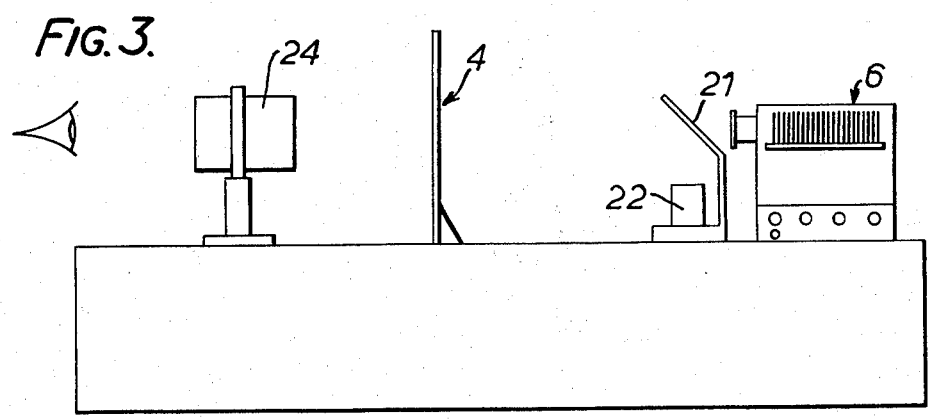
FIG. 3 shows a side view of a modified form of the apparatus of FIGS. 1 and 2.

FIG. 3 shows how a rotatable "dove" prism 24 can be mounted in front of the screen 4 and through which the observer views the screen. This enables the number of slides or flim frames to be reduced since rotation of the prism 24 alters the angular position of the pattern viewed by the patient. This modification may, however, result in an increase in the time taken to perform a given sequence of tests.

It may also be possible to reduce the number of slides still further by using one slide, for example with the smallest chequer pattern on it, and altering the apparent size of this chequer pattern as seen by the subject, by increasing the magnification of the projected image. The apparent size of the chequer pattern may be increased by increasing the projector screen distance and modifying the focus. Alternatively a change in magnification may be achieved by using lenses of different focal lengths and bringing them into an appropriate position in front of the projector when required.

Figure 4:
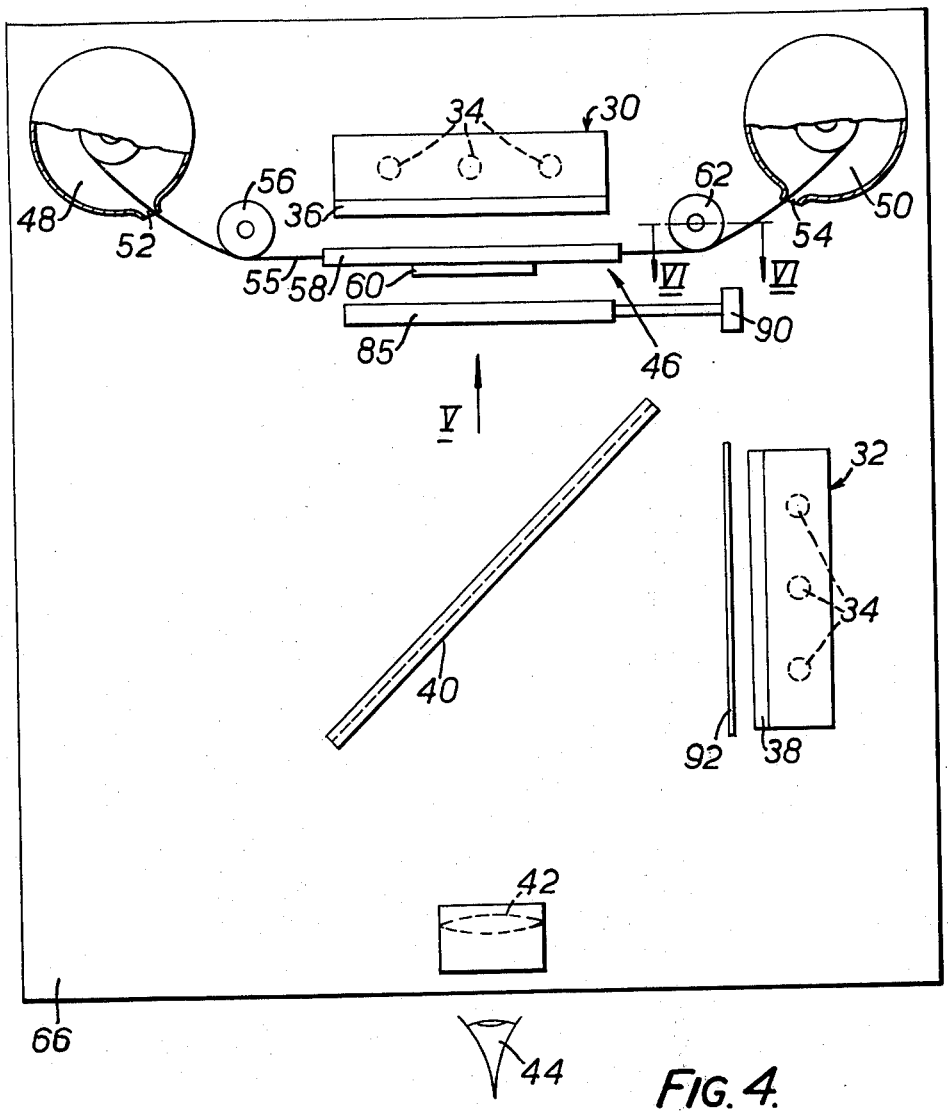
FIG. 4 is a plan view of another form of the apparatus.

The apparatus in FIG. 4 incorporates two light assemblies 30 and 32. Each incorporates fluorescent tubes 34 which are electronically controllable and preferably produce white light. Each assembly incorporates a diffuser plate 36, 38 (of opal glass, for example) which is mounted sufficiently far in front of the tubes 34 to ensure substantially uniform brightness. Each light assembly 30, 32 projects its light towards a beam splitter 40 which is mounted at 45° to each light assembly and at 45° to a well-corrected lens 42 through which the patient, shown diagrammatically at 44, views the presentation.

A film transport assembly 46 is mounted in front of the light assembly 30. The film transport assembly comprises two cassettes, a storage cassette 48 and a receiver cassette 50 whose tops are partially broken away for illustrative purposes, mounted on respective rotatable spindles and having felt-lined entry/exit slits 52, 54. The film strip 55 is led out of the cassette 48 over a guide sprocket 56, through a guide frame 58 which is opaque except for a window 60, round a driving sprocket 62, and into the receiver cassette 50. A small electric motor (not shown) is continuously energised to apply a torque to the receiver cassette 50 so as to hold the film strip in tension.

Figure 6:
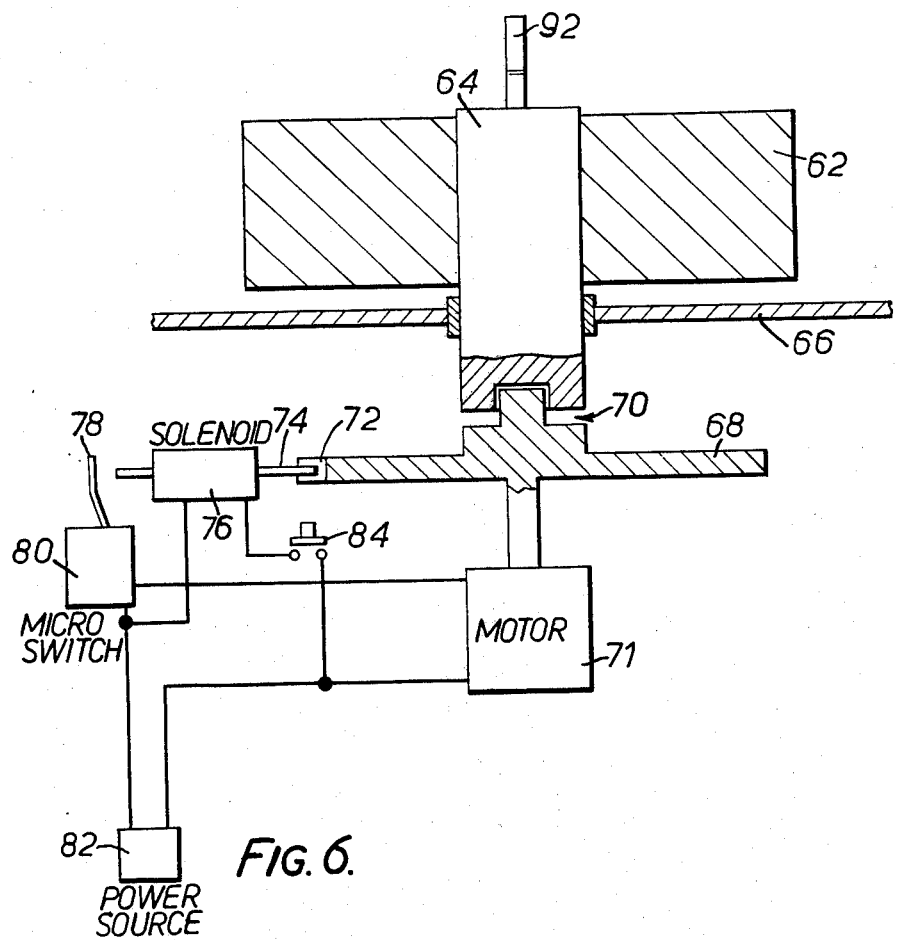
FIG. 6 is a section on the line VI—VI of FIG. 4.
Figure 7:
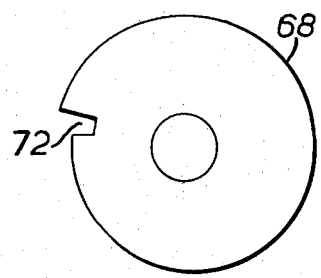
FIG. 7 is a scrap plan view of part of FIG. 6.

As shown in FIG. 6, the drive sprocket 62 is mounted on a spindle 64 which is rotatably supported in a bearing in a base plate 66. The spindle 64 engages a cam 68 via a dog clutch 70, the cam 68 being fast with the shaft of a drive motor 71. The cam 68 is approximately circular in shape (though not completely so, as shown in FIG. 7 which is a plan view of the cam 68 alone), but has a single peripheral slot 72 which can receive the plunger 74 of a solenoid 76. The plunger is spring biased towards the cam 68 and its opposite end moves adjacent the actuator 78 of a microswitch 80. The electrical circuitry is shown diagrammatically in FIG. 6 and includes a power source 82 and a push button switch 84.

Figure 5:
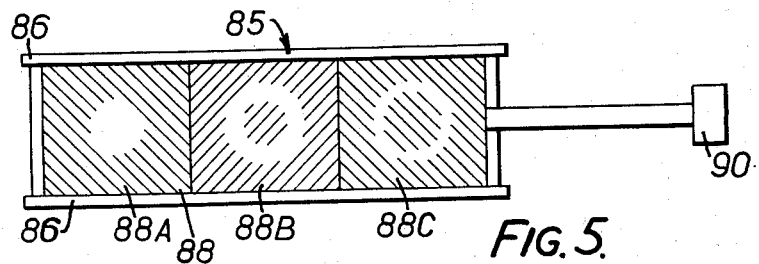
FIG. 5 is a front view of part of the apparatus of FIG. 4 looking in the direction of the arrow V of FIG. 4.

A mask slide 85 (FIGS. 4 and 5) is mounted in front of the film transport assembly 46 and is shown in more detail in FIG. 5. The mask slide 85 comprises two rails 86 which are spaced apart for slidingly receiving a mask unit 88 comprising, in this example, three masks 88A, 88B and 88C. Each mask is opaque except as shown, and a knob 90 enables any one of the masks to be positioned in front of the window 60 (FIG. 4). A detent arrangement (not shown) may be provided to facilitate correct alignment of each mask.

The light assembly 32 has a translucent plate 92 in front of it with a central light transmitting cross so as to provide a central fixation cross (corresponding to the cross 5 of FIG. 2) for the image viewed by the observer.

The lens 42 is advantageously an achromatic lens with a focal length of, say, 6 inches and mounted so that the pattern is seen at infinity: if the image seen has a diameter of 2 inches, say, then it subtends an angle of about 20°.

Two separate film strips are provided. Each comprises a number of different frames each carrying a differently arranged chequer pattern, generally as described in connection with FIGS. 1 and 2. On one strip, there are several (for example, eight to 15) different sizes of chequer pattern and for each chequer pattern size there are four frames each with the pattern in a different quadrant. On the other film strip, there are again several different sizes of chequer pattern, but for each pattern size there are eight frames each with the pattern in a different octant. Other pattern arrangements, using stripes for example, may be used instead however.

In operation, assuming initially that the mask unit 88 is removed, the frames having the quadrantically arranged chequer patterns are stepped past the window 60 so as to be displayed in turn to the patient. In order to step the film, the switch 84 (FIG. 6) is momentarily depressed to energise the solenoid 76. This retracts the plunger 74 out of the slot 72 in the cam 68, and the opposite end of the plunger closes the microswitch 80. Motor 71 is therfore energised and rotates the cam 68, and thus the drive sprocket 62. Release of the press button 84 after the motor 71 has commenced to turn has no effect on the motor circuit because the plunger 74 is held in its retracted position by contact with the periphery of the cam 68. The cam therefore makes one revolution, at the end of which the plunger 74 springs back into the slot 72, halts the cam 68 and sprocket 62, and opens the motor circuit. In this way, the drive sprocket can only make one revolution at a time, and the sprocket diameter is so related to the film length that one revolution of the sprocket corresponds to a film movement of one frame.

The light assemblies 30 and 32 are then pulsed, either under control of a different switch (not shown) or automatically, on release of the solenoid 76 for example, to illuminate the tubes 34 and thus present the image to the patient for the required very short period of time. The patient is then asked for his response in the manner described in connection with FIGS. 1 and 2.

During this process, the light assembly 32 provides general background illumination and also the fixation cross. The light assemblies 30 and 32 may be pulsed so that, for both of them, the change in luminance (brightness) is only a fraction of the initial luminance. Furthermore, they may be pulsed so that there is no change in the total light flux (total light energy) reaching the eye during the stimulus pulse.

With the mask unit 88 in position, any one of the three masks 88A, 88B, 88C can be positioned in front of the window 60. Mask unit 88A for example, enables the patient to view only the central 4° angular width of the image. Selection of mask 88B enables the portion of the image between 4° and 10° to be viewed, while mask 88C enables the portion between 10° and 16° of the image to be viewed. Other masks can of course be used.

Different types of colour filter can be positioned in front of the light assemblies 30 and 32: this is of a special interest for retrobulbar neuritis and optic atrophy.

In order to rewind the film strip, the spindle 64 and sprocket 62 are raised by means of a knob 92 (which is rotatably mounted on the spindle 64) so as to disengage the dog clutch 70. A handle (not shown) can then be used to rotate the spindle of the storage cassette 48 to rewind the film strip. During this process, the torque motor on the receiver cassette 50 can be deenergised.

The apparatus described therefore enables different conditions to be easily and quickly checked as described in more detail with reference to FIGS. 1 and 2: for example, early quadrantic acuity loss (such as due to brain lesion), or annular, octant or quadratic loss extending from or near the blind spot caused by a retinal lesion.

Accurate foveal fixation may be assisted by using either (a) entopic view of Haidinger's brushes via a rotating polarizer, or (b) entopic view of Maxwell's spot through appropriate alternating coloured filters. At the instant when the acuity is to be measured by presentation of the slide pattern, the fixation assistance may be removed, or alternatively the pattern may be superimposed on the fixation assisting field. The apparatus described can be used in the presence of field defects which even invade parts of the fovea.

What is claimed is:

1. A method of testing visual acuity in a human subject, comprising the steps of
    presenting a continuous fixation mark to the subject in his visual field,
    sequentially presenting to the subject, while he is fixating on the fixation mark, a plurality of visual images, each image being presented for a brief and constant length of time and part only of the said image comprising a pattern of regular variations between two visually constrasting levels, the said pattern being in a selected and randomised position relative to the fixation mark, and
    maintaining the mean luminance of each said pattern to be substantially identical with the mean luminance of the remainder of each image, and
    for each presentation, changing a visually sensible parameter of the pattern compared with the previous presentation.

2. A method according to claim 1, in which the step of changing a visually sensible parameter of the pattern of each presentation comprises the step of changing the position of the pattern in the image.

3. A method according to claim 1, in which the step of changing a visually sensible parameter of the pattern for each presentation comprises the step of changing the spatial frequency of the said variations.

4. A method according to claim 1, in which the said regular variations are variations between two different luminance levels.

5. A method according to claim 1, in which the said regular variations are variations between two different chromatic levels.

6. A method according to claim 1, in which the said regular variations are sine wave variations.

7. A method according to claim 1, in which the said regular variations are abrupt changes between the two said levels.

8. A method according to claim 7, in which each pattern is a chequer pattern having a predetermined chequer size.

9. A method according to claim 1, in which each pattern occupies at least part of a predetermined arc of a circle.

10. A method according to claim 1, in which the step of presenting a fixation mark to the subject comprises the step of presenting a fixation spot in the center of each image.

11. Apparatus for testing visual acuity in human subjects, comprising fixation means for presenting a continuous fixation mark to the subject for his visual field, presentation means for successively presenting, for respective brief and constant periods of time, respective visual images each including a pattern of regular variations between two visually contrasting levels which extends over a predetermined part only of the image, the said pattern being in a selected and randomised position relative to the fixation mark, and adjusting means for changing a visually sensible parameter of the pattern for each presentation while maintaining the mean luminance of each said pattern to be substantially identical with that of the remainder of the said image.

12. Apparatus according to claim 11, in which the presentation means comprises film means made up of a plurality of film sections respectively bearing said visual images each including a said pattern comprising distinctive edges extending over said predetermined part only of the image and arranged whereby for each image of the two visually sensible parameters consisting of the length of the said edges per unit area of the pattern and the position of the pattern relative to the image as a whole is different from the corresponding parameter for the other images, and means defining a predetermined light path capable of being illuminated for presenting for the brief and constant period of time an image corresponding to the image on the one of the film sections positioned in the light path, and the said adjusting means comprises means for positioning a different one of the film sections in the light path.

13. Apparatus according to claim 12, in which the film means comprises a film strip with each film section arranged on a different film frame, and the presentation means includes film transport means for supporting the film strip, and drive means for incrementally moving the film strip, frame by frame, past a datum area aligned with the light path.

14. Apparatus according to claim 13, in which the drive means includes a base, a rotatable drive member mounted on the base for engaging and driving the film strip, an electrical driving motor mounted on the base for rotating the rotatable drive member, switch means for controlling the energisation of the motor, a peripheral surface rotatable with the drive member and having a peripheral recess therein, a locking member resiliently biased into contact with the peripheral recess to lock the drive member against rotation, when the drive member is appropriately angularly spaced, and means for momentarily withdrawing the locking member against its resilient bias into a position in which it closes the said switch means to complete the energisation circuit for the motor, the consequent angular movement of the rotatable drive member preventing return of the withdrawn locking member and holding the switch means closed until the said surface has completed one revolution whereupon the locking member is biased back into the said recess and opens the switch means.

15. Apparatus according to claim 12, in which the film means comprises a plurality of film slides each forming one of the film sections.

16. Apparatus according to claim 11, in which the presentation means includes means bearing at least one visual image including a pattern of regular variations between two visually constrasting levels which extends over a predetermined part only of the image, defining a predetermined light path capable of being illuminated for presenting for the brief and constant period of time an image corresponding to the said one visual image, and the said adjusting means comprises optical means in the said light path and optically adjustable for changing the said visually sensible parameter.

17. Apparatus according to claim 16, in which the optical means includes a dove prism angularly movable for rotating the presented image into different angular positions.

18. Apparatus according to claim 16, in which the optical means includes means for altering the degree of magnification given to the present image.

19. Apparatus according to claim 11, in which the presentation means includes means for supporting an optical mask of predetermined pattern in the light path, whereby the presented image is dependent on the pattern of the mask.

20. Apparatus according to claim 11, in which each said pattern is a pattern of substantially sinusoidal variations between the two said levels.

21. Apparatus according to claim 11, in which each said pattern is a chequer pattern of predetermined chequer size.

22. Apparatus according to claim 11, in which each pattern occupies at least part of an arc of a circle.

23. Apparatus according to claim 11, in which the said two levels are levels of different luminance.

24. Apparatus according to claim 11, in which the said two levels are different chromatic levels.

25. Apparatus for testing visual acuity in human subjects, comprising means for continuously presenting a fixation mark for the subject for his visual field, film means made up of a plurality of film sections each bearing a different visual image, each image being generally circular in shape and including a pattern of visually sensible edges between two contrasting levels which occupies part only of the circle, said patterns in some of the film sections occupying different parts of the circle as compared with the patterns in the others, and some of the film sections having a greater spatial frequency of edges than the others, but the mean visual intensity of each said pattern being substantially identical with that of the remainder of its said image, and means for successively presenting the visual images of the film sections in the subject's visual field with a predetermined and randomised orientation relative to the fixation mark.

26. Apparatus according to claim 25, in which the film means comprises a plurality of film slides each forming one of the film sections.

27. Apparatus according to claim 25, in which the film means comprises film strip having a series of frames each of which forms a respective one of the film sections.

28. A method of testing visual acuity in a human subject, comprising the steps of presenting a fixation mark to the subject for his visual field, sequentially presenting to the subject in his visual field a pluarlity of visual images for detection of their spatial pattern by the subject, each image being presented for a brief and constant length of time and including a pattern of abrupt changes between two different colors whose luminances are equal, and for each presentation, changing a visually sensible parameter of the pattern in a randomised manner compared with the previous presentation.

29. Apparatus for testing visual acuity in human subjects comprising means for presenting a fixation mark to the subject for his visual field, and presentation means for successively presenting to the subject in his visual field, for respective brief and constants periods of time, respective visual images for detection of their spatial pattern by the subject, each image including a pattern of abrupt variations between two different colors of equal luminance, a visually sensible parameter of each pattern being different in a randomised manner from that for the other patterns.

* * * * *